United States Patent
Chaubey et al.

(10) Patent No.: US 12,306,832 B2
(45) Date of Patent: *May 20, 2025

(54) SYSTEMS AND METHODS FOR REDUCING COMPUTATIONAL RESOURCE USAGE IN A QUERY-BASED DATA ACCESS SYSTEM VIA A REPEATED QUERY RESULTS REPOSITORY

(71) Applicant: Wells Fargo Bank, N.A., San Francisco, CA (US)

(72) Inventors: Mayuri Chaubey, Bangalore (IN); Rameshchandra Bhaskar Ketharaju, Hyderabad (IN); Sitara Kumbale, Bangalore (IN); Vinayak Sodar, Dharwad (IN); Manak Suri, New Delhi (IN); Ashutosh Verma, Bangalore (IN); Naveen Yeri, Bangalore (IN)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/670,446

(22) Filed: May 21, 2024

(65) Prior Publication Data
US 2024/0311373 A1    Sep. 19, 2024

Related U.S. Application Data

(63) Continuation of application No. 17/656,204, filed on Mar. 23, 2022, now Pat. No. 12,019,631.

(51) Int. Cl.
*G06F 16/245* (2019.01)
*G06F 11/34* (2006.01)
(Continued)

(52) U.S. Cl.
CPC .... *G06F 16/24539* (2019.01); *G06F 11/3409* (2013.01); *G06F 16/242* (2019.01); *G06F 16/2462* (2019.01)

(58) Field of Classification Search
None
See application file for complete search history.

(56) References Cited

U.S. PATENT DOCUMENTS 7,941,426 B2    5/2011  Bestgen
2005/0240570 A1* 10/2005 Ozbutun ........... G06F 16/24539
(Continued)

OTHER PUBLICATIONS

Using the History Page to Monitor Queries—Snowflake Documentation, https://docs.snowflake.com/en/user-guide/ui-hisotry.html, 5 pages, Oct. 2021.
(Continued)

*Primary Examiner* — Son T Hoang
(74) *Attorney, Agent, or Firm* — K&L Gates LLP

(57) ABSTRACT

An example method includes receiving and preprocessing a query request prior to execution of a query. Through preprocessing, a probability that execution of the query would yield a result set similar to at least a portion of results stored in a repeated query result repository is obtained. In response to the probability satisfying a probability threshold, a portion of results is retrieved from the repository. The example method further includes causing transmission of a response to the query request, the response comprising the portion of results.

20 Claims, 6 Drawing Sheets

(51) Int. Cl.
  *G06F 16/24*    (2019.01)
  *G06F 16/242*   (2019.01)
  *G06F 16/2453*  (2019.01)
  *G06F 16/2458*  (2019.01)

(56) References Cited

U.S. PATENT DOCUMENTS

| | | | |
|---|---|---|---|
| 2007/0043706 A1* | 2/2007 | Burke | G06F 16/951 |
| 2011/0258179 A1* | 10/2011 | Weissman | G06F 16/24537 |
| | | | 707/713 |
| 2012/0059820 A1* | 3/2012 | Lakshmanan | G06F 16/9535 |
| | | | 707/E17.084 |
| 2013/0339340 A1* | 12/2013 | Pfitzner | G06F 16/95 |
| | | | 707/E17.017 |
| 2016/0178385 A1 | 6/2016 | Zhao | |
| 2017/0037168 A1 | 2/2017 | Nagao | |
| 2017/0213257 A1* | 7/2017 | Murugesan | G06F 16/24 |
| 2017/0277747 A1* | 9/2017 | Tremayne | G06F 16/2425 |
| 2018/0336244 A1* | 11/2018 | Barsness | G06F 16/24544 |
| 2020/0057764 A1* | 2/2020 | Chin | G06F 16/24522 |
| 2020/0134070 A1 | 4/2020 | Sidoti | |
| 2021/0011916 A1 | 1/2021 | Zhou | |
| 2021/0097850 A1* | 4/2021 | Ton-That | G06F 16/587 |

OTHER PUBLICATIONS

A.WS CLI Command Reference User Guide, Amazon Web Services, http://docs.aws.amazon.com/cli/latest/userguide/, 2021.

* cited by examiner

SYSTEMS AND METHODS FOR REDUCING COMPUTATIONAL RESOURCE USAGE IN A QUERY-BASED DATA ACCESS SYSTEM VIA A REPEATED QUERY RESULTS REPOSITORY

CROSS REFERENCE TO RELATED APPLICATIONS

This application is a continuation of U.S. patent application Ser. No. 17/656,204, filed Mar. 23, 2022, the entire contents of which are incorporated herein by reference.

BACKGROUND

Many modern computing systems rely on data hosted by various infrastructure components which may be distributed over a wide geographic area. To manage access to data, query-based data access systems may be used. Query-based data access systems provide users with the ability to retrieve and/or view data through customizable queries. Query-based data access systems may benefit the user by abstracting the complexities of data access across the various infrastructure components.

BRIEF SUMMARY

By virtue of the abstraction provided by query-based data access systems, users are less able to ascertain the impact of various methods of using the query system to obtain data. For example, query-based data access systems may provide powerful interfaces that allow users to precisely define queries for certain data, but generally do not inform users on how actually obtaining the data will impact the system or otherwise be carried out. For example, users may be unaware of the previous execution of similar queries (e.g., by other users of the query-based data access system), which may lead to the repetitive execution of similar queries and causing the same or similar computations to be repeatedly performed. In this regard, traditional query-based data access systems often result in high energy consumption and low energy efficiency because energy and environmental issues are not typically considered in the design process for these systems. Instead, traditional query-based data access systems are optimized for query execution speed, resulting in a trade-off of increased resource and power use for increased speed of executing and returning results of queries.

Systems, apparatuses, methods, and computer program products are disclosed herein for reducing computational resource usage in a query-based data access system. Embodiments detailed herein improve upon traditional query-based data access systems by introducing a transparent preprocessing layer directed to energy-aware query optimization and energy-efficient query processing. In some embodiments, the preprocessing layer may be implemented to include an inference model usable to estimate an energy consumption level of a query prior to execution of the query. The predictions may be used when selecting how to implement a query in response to a received query request from a user of a query-based data access system.

In one example embodiment, a method is provided for reducing computational resource usage in a query-based data access system. The method includes receiving, by communications circuitry, a query request from a device. The method also includes preprocessing, by statistical analysis circuitry, the query request prior to an execution of a query associated with the query request. The preprocessing includes comparing, by the statistical analysis circuitry, the query request to metadata associated with a repeated query result (RQR) repository. The preprocessing also includes obtaining, by the statistical analysis circuitry and based on the comparison, a probability that an execution of the query associated with the query request will yield a result set similar to at least a portion of results of the RQR repository. The preprocessing also includes determining, by the statistical analysis circuitry, whether the probability satisfies a probability threshold. The method also includes, in response to determining that the probability satisfies the probability threshold, retrieving, by the communications circuitry, the portion of results from the RQR repository and causing transmission, by the communications circuitry, of a response to the query request, the response comprising the portion of results. The method also includes, in response to determining that the probability does not satisfy the probability threshold, causing transmission, by the communications circuitry, of the query for execution, receiving, by the communications circuitry, a query result set based on execution of the query, and causing transmission, by the communications circuitry, of the response to the query request, the response comprising the query result set.

In another example embodiment, an apparatus is provided for reducing computational resource usage in a query-based data access system. The apparatus includes statistical analysis circuitry configured to preprocess a query request prior to an execution of a query associated with the query request. The statistical analysis circuitry preprocesses the query request by comparing the query request to metadata associated with a repeated query result (RQR) repository, obtaining, based on the comparison, a probability that an execution of the query associated with the query request will yield a result set similar to at least a portion of results of the RQR repository, and determining whether the probability satisfies a probability threshold. The apparatus also includes communications circuitry configured to receive the query request from a device. The communications circuitry is also configured to, in response to determining that the probability satisfies the probability threshold, retrieve the portion of results from the RQR repository, and cause transmission of a response to the query request, the response comprising the portion of results. The communications circuitry is also configured to, in response to determining that the probability does not satisfy the probability threshold, cause transmission of the query for execution, receive a query result set based on execution of the query, and cause transmission of the response to the query request, the response comprising the query result set.

In another example embodiment, a computer program product is provided for reducing computational resource usage in a query-based data access system. The computer program product includes at least one non-transitory computer-readable storage medium storing software instructions that, when executed, cause an apparatus to receive a query request from a device. The instructions, when executed, further cause the apparatus to preprocess the query request prior to an execution of a query associated with the query request. The preprocessing includes comparing the query request to metadata associated with a repeated query result (RQR) repository, obtaining, based on the comparison, a probability that an execution of the query associated with the query request will yield a result set similar to at least a portion of results of the RQR repository, and determining whether the probability satisfies a probability threshold. The instructions, when executed, further cause the apparatus to, in response to determining that the probability satisfies the probability threshold, retrieve the portion of results from the RQR repository and cause transmission, of a response to the query request, the response comprising the portion of results. The instructions, when executed, further cause the apparatus to, in response to determining that the probability does not satisfy the probability threshold, cause transmission of the query for execution, receive a query result set based on execution of the query, and cause transmission of the response to the query request, the response comprising the query result set.

The foregoing brief summary is provided merely for purposes of summarizing some example embodiments described herein. Because the above-described embodiments are merely examples, they should not be construed to narrow the scope of this disclosure in any way. It will be appreciated that the scope of the present disclosure encompasses many potential embodiments in addition to those summarized above, some of which will be described in further detail below.

BRIEF DESCRIPTION OF THE FIGURES

Having described certain example embodiments in general terms above, reference will now be made to the accompanying drawings, which are not necessarily drawn to scale. Some embodiments may include fewer or more components than those shown in the figures.

DETAILED DESCRIPTION

Figure 1:
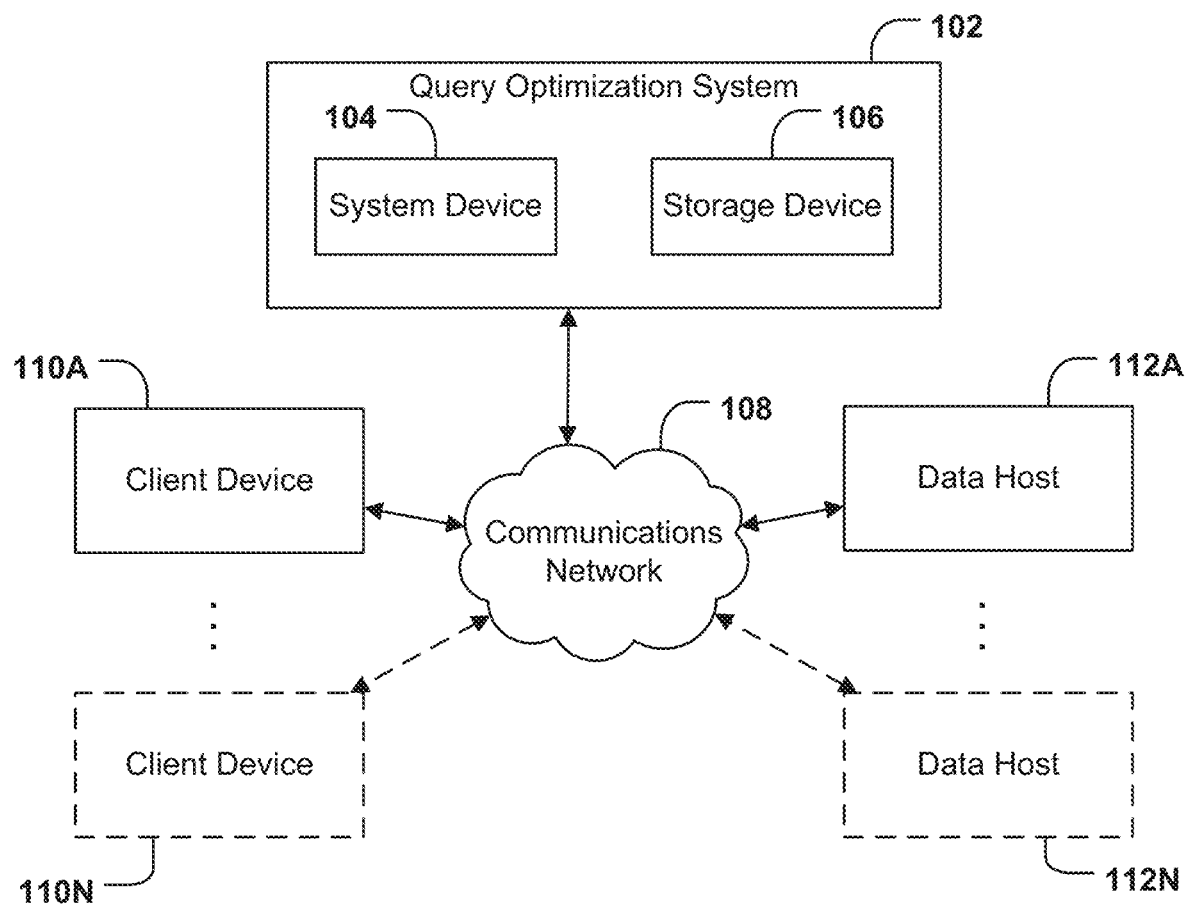
FIG. 1 illustrates a system in which some example embodiments may be used.

Some example embodiments will now be described more fully hereinafter with reference to the accompanying figures, in which some, but not necessarily all, embodiments are shown. Because inventions described herein may be embodied in many different forms, the invention should not be limited solely to the embodiments set forth herein; rather, these embodiments are provided so that this disclosure will satisfy applicable legal requirements.

The term "client device" is used herein to refer to any one or all of programmable logic controllers (PLCs), programmable automation controllers (PACs), industrial computers, desktop computers, personal data assistants (PDAs), laptop computers, tablet computers, smart books, palm-top computers, personal computers, smartphones, wearable devices (such as headsets, smartwatches, or the like), and similar electronic devices equipped with at least a processor and any other physical components necessarily to perform the various operations described herein. Devices such as smartphones, laptop computers, tablet computers, and wearable devices are generally collectively referred to as client devices.

The term "server" or "server device" is used to refer to any computing device capable of functioning as a server, such as a master exchange server, web server, mail server, document server, or any other type of server. A server may be a dedicated computing device or a server module (e.g., an application) hosted by a computing device that causes the computing device to operate as a server. A server module (e.g., server application) may be a full function server module, or a light or secondary server module (e.g., light or secondary server application) that is configured to provide synchronization services among the dynamic databases on computing devices. A light server or secondary server may be a slimmed-down version of server type functionality that can be implemented on a computing device, such as a smart phone, thereby enabling it to function as an Internet server (e.g., an enterprise e-mail server) only to the extent necessary to provide the functionality described herein.

The term "query" refers to a textual string of code, that, when executed, is configured to query one or more databases (e.g., stored at a data host) and return data specified by the query. A query may include elements including native commands associated with a query language in which the query is written. The elements may also include references to particular databases, tables, records, fields and/or the like from which the query is requesting data be returned. It is to be appreciated that the example operations described herein are not confined to particular types of queries and may be carried out using queries written in any query language.

The term "query request" refers to a message received by a query-based data access system. A query request may be from another device (e.g., a client device). A query request may include at least one query for the query-based data access system to process and/or execute. For example, a user (e.g., via a client device and/or direct interaction with the query-based data access system) may submit a query request including one or more queries which the user is requesting to be executed. A query request may include additional information such as one or more identifiers indicating the source of the query request (e.g., a client device identifier, user identifier, and/or the like), one or more timestamps indicating a particular time at which the query was generated and/or the query request was sent and/or received, and/or other times or information relating to the query request.

Overview

As noted above, methods, apparatuses, systems, and computer program products are described herein that reduce computational resource usage, and, by that effect, energy consumption in a query-based data access system. Traditionally, query-based data access systems are configured to deliver results of queries at high speeds with little or no regard to computational resource (e.g., network, processor, memory, bandwidth, etc.) usage and energy consumption. For instance, sources of data (e.g., data hosts storing databases or the like), over which queries may be executed, may be distributed anywhere in the world across any number of locations. Given this, execution of queries may include transmitting the queries and results of the queries over long distances, negatively impacting network bandwidth. Further, queries may be positioned in a queue (e.g., by the data host)

of thousands or even millions of queries which need to be processed by the data host, further increasing resource usage.

The significant impact on computational resources due to the configuration of these conventional query-based data access systems is particularly brought to light by the fact that many queries processed by the query-based data access systems may be structured in a same or similar manner, such that execution of the queries bring about a same or similar set of results. In this regard, for each received query, a computationally-intensive process of determining results for the query is still performed, even though the same results may have already been determined for a similar query.

In contrast to conventional configurations and techniques of query-based data access systems, example embodiments described herein may preprocess a query request prior to execution of a query associated with the query request. Embodiments herein leverage metadata associated with a Repeated Query Result (RQR) repository during the preprocessing in order to determine whether all or a portion of a query needs to be executed, or whether the query needs to be executed at all. In some embodiments, the RQR repository may be a dedicated repository that stores previous query results that have been repeatedly generated (e.g., a predefined number of times) by previous queries originating from a particular client device or a system and/or network associated with the particular client device. In other words, for related devices which frequently submit query requests to a query-based data access system, common query results of those query requests may be stored in a dedicated RQR repository which is local to the related devices (e.g., within a network or system associated with a particular company, entity, and/or the like, or otherwise physically local). In this manner, a new query request may be analyzed in connection with metadata of the RQR repository to determine a probability that an execution of query associated with the query request would yield results similar to results already stored in the RQR repository. In some embodiments, these pre-stored results may be retrieved from the RQR repository and provided to a client device as a response to the query, thus bypassing the need to execute the query and saving significant computational resources that would otherwise be required to execute the query.

Accordingly, the present disclosure sets forth systems, methods, and apparatuses that reduce computational resource usage in a query-based data access system. There are many advantages of these and other embodiments described herein. For instance, usage of a dedicated and local RQR repository reduces network transmissions in terms of both (i) query execution and subsequent result retrieval that would have otherwise been performed and (ii) the efficient and lightweight retrieval of results gained given the locality of the RQR repository. Additionally, in some embodiments, a check may be performed to determine whether one or more data sets associated with a query request have been modified since a storage of results associated with the one or more data sets in the RQR repository was performed. If the data sets have been modified, at least a portion of a query associated with the query request may be re-executed. For example, in some embodiments, the query may be automatically modified to only execute over a data set which has been updated. In this regard, a portion of results of the query may be retrieved from the RQR repository, while another portion of results may be acquired through execution of the modified query over the updated data sets, thus guaranteeing data freshness of the query results while still reducing overall computational resource usage and energy consumption through gathering the results.

Although a high level explanation of the operations of example embodiments has been provided above, specific details regarding the configuration of such example embodiments are provided below.

System Architecture

Example embodiments described herein may be implemented using any of a variety of computing devices or servers. To this end, FIG. 1 illustrates an example environment within which various embodiments may operate. As illustrated, a query optimization system 102 (which may be a component of a query-based data access system) may include a system device 104 in communication with a storage device 106. Although system device 104 and storage device 106 are described in singular form, some embodiments may utilize more than one system device 104 and/or more than one storage device 106. Additionally, some embodiments of the query optimization system 102 may not require a storage device 106 at all. Whatever the implementation, the query optimization system 102, and its constituent system device(s) 104 and/or storage device (s) 106 may receive and/or transmit information via communications network 108 (e.g., the Internet) with any number of other devices, such as one or more of client devices 110A-110N and/or data hosts 112A-112N.

System device 104 may be implemented as one or more servers, which may or may not be physically proximate to other components of query optimization system 102. Furthermore, some components of system device 104 may be physically proximate to the other components of query optimization system 102 while other components are not. System device 104 may receive, process, generate, and transmit data, signals, and electronic information to facilitate the operations of the query optimization system 102. Particular components of system device 104 are described in greater detail below with reference to apparatus 200 in connection with FIG. 2.

Storage device 106 may comprise a distinct component from system device 104, or may comprise an element of system device 104 (e.g., memory 204, as described below in connection with FIG. 2). Storage device 106 may be embodied as one or more direct-attached storage (DAS) devices (such as hard drives, solid-state drives, optical disc drives, or the like) or may alternatively comprise one or more Network Attached Storage (NAS) devices independently connected to a communications network (e.g., communications network 108). Storage device 106 may host the software executed to operate the query optimization system 102. Storage device 106 may store information relied upon during operation of the query optimization system 102, such as various query requests that may be received and processed by the query optimization system 102, data and documents to be analyzed using the query optimization system 102, or the like. In addition, storage device 106 may store control signals, device characteristics, and access credentials enabling interaction between the query optimization system 102 and one or more of the client devices 110A-110N or data hosts 112A-112N.

The one or more client devices 110A-110N may be embodied by any storage devices known in the art. Similarly, the one or more data hosts 112A-112N may be embodied by any computing devices known in the art, such as desktop or laptop computers, tablet devices, smartphones, servers, or the like. The one or more client devices 110A-110N and the one or more data hosts 112A-112N need not themselves be independent devices, but may be peripheral devices communicatively coupled to other computing devices.

Although FIG. 1 illustrates an environment and implementation in which the query optimization system 102 interacts with one or more of client devices 110A-110N and/or data hosts 112A-112N, in some embodiments users may directly interact with the query optimization system 102 (e.g., via input/output circuitry of system device 104), in which case a separate client device 110A-110N may not be utilized. Whether by way of direct interaction or via a separate client device 110A-110N, a user may communicate with, operate, control, modify, or otherwise interact with the query optimization system 102 to perform the various functions and achieve the various benefits described herein.

Example Implementing Apparatuses

Figure 2:
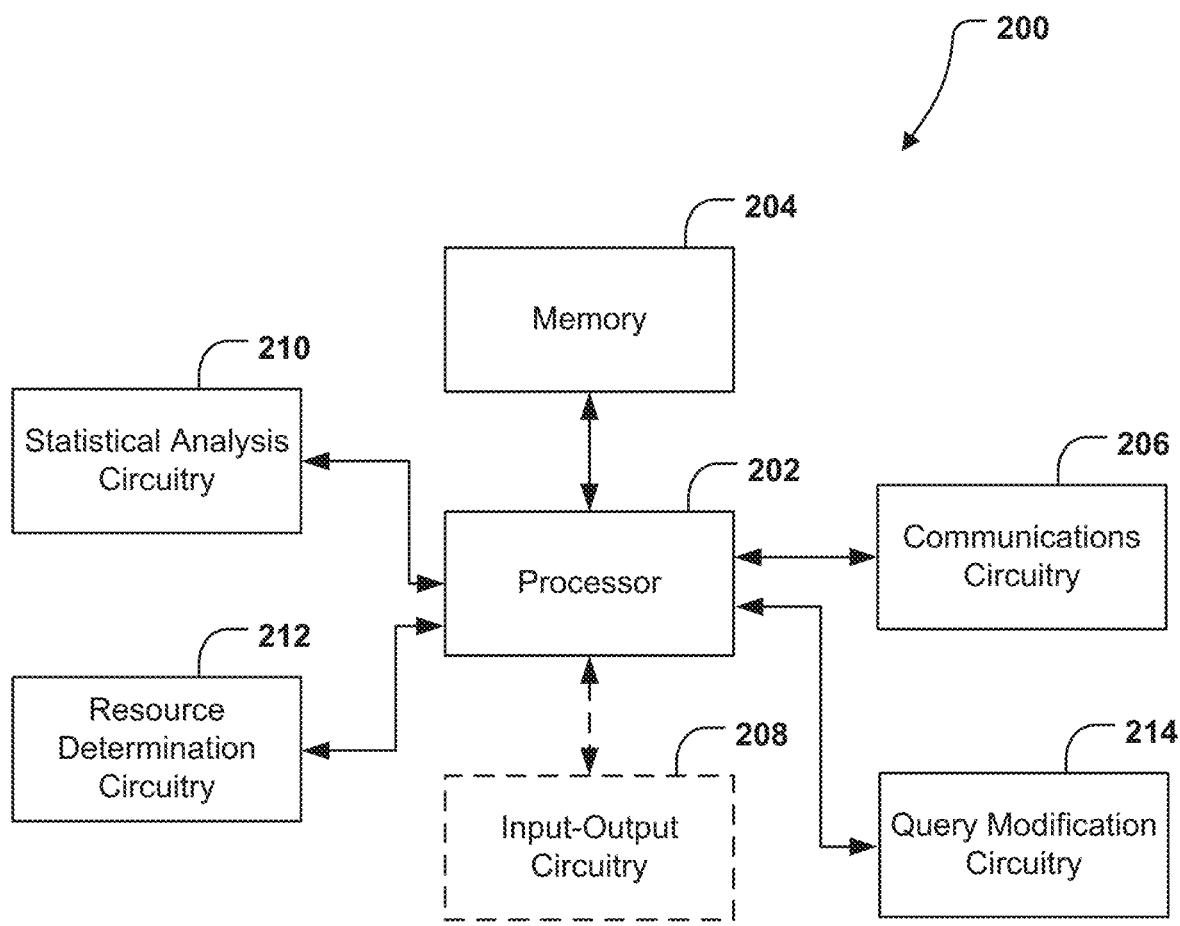
FIG. 2 illustrates a schematic block diagram of example circuitry embodying a device that may perform various operations in accordance with some example embodiments described herein.

System device 104 of the query optimization system 102 (described previously with reference to FIG. 1) may be embodied by one or more computing devices or servers, shown as apparatus 200 in FIG. 2. As illustrated in FIG. 2, the apparatus 200 may include processor 202, memory 204, communications circuitry 206, input-output circuitry 208, statistical analysis circuitry 210, resource determination circuitry 212, and query modification circuitry 214, each of which will be described in greater detail below. While the various components are only illustrated in FIG. 2 as being connected with processor 202, it will be understood that the apparatus 200 may further comprises a bus (not expressly shown in FIG. 2) for passing information amongst any combination of the various components of the apparatus 200. The apparatus 200 may be configured to execute various operations described above in connection with FIG. 1 and below in connection with FIGS. 3-5B.

The processor 202 (and/or co-processor or any other processor assisting or otherwise associated with the processor) may be in communication with the memory 204 via a bus for passing information amongst components of the apparatus. The processor 202 may be embodied in a number of different ways and may, for example, include one or more processing devices configured to perform independently. Furthermore, the processor may include one or more processors configured in tandem via a bus to enable independent execution of software instructions, pipelining, and/or multithreading. The use of the term "processor" may be understood to include a single core processor, a multi-core processor, multiple processors of the apparatus 200, remote or "cloud" processors, or any combination thereof.

The processor 202 may be configured to execute software instructions stored in the memory 204 or otherwise accessible to the processor (e.g., software instructions stored on a separate storage device 106, as illustrated in FIG. 1). In some cases, the processor may be configured to execute hard-coded functionality. As such, whether configured by hardware or software methods, or by a combination of hardware with software, the processor 202 represent an entity (e.g., physically embodied in circuitry) capable of performing operations according to various embodiments of the present invention while configured accordingly. Alternatively, as another example, when the processor 202 is embodied as an executor of software instructions, the software instructions may specifically configure the processor 202 to perform the algorithms and/or operations described herein when the software instructions are executed.

Memory 204 is non-transitory and may include, for example, one or more volatile and/or non-volatile memories.

In other words, for example, the memory 204 may be an electronic storage device (e.g., a computer readable storage medium). The memory 204 may be configured to store information, data, content, applications, software instructions, or the like, for enabling the apparatus to carry out various functions in accordance with example embodiments contemplated herein.

The communications circuitry 206 may be any means such as a device or circuitry embodied in either hardware or a combination of hardware and software that is configured to receive and/or transmit data from/to a network and/or any other device, circuitry, or module in communication with the apparatus 200. In this regard, the communications circuitry 206 may include, for example, a network interface for enabling communications with a wired or wireless communication network. For example, the communications circuitry 206 may include one or more network interface cards, antennas, buses, switches, routers, modems, and supporting hardware and/or software, or any other device suitable for enabling communications via a network. Furthermore, the communications circuitry 206 may include the processor for causing transmission of such signals to a network or for handling receipt of signals received from a network.

The apparatus 200 may include input-output circuitry 208 configured to provide output to a user and, in some embodiments, to receive an indication of user input. It will be noted that some embodiments will not include input-output circuitry 208, in which case user input may be received via a separate device such as a client device (e.g., one of the client devices 110A-110N shown in FIG. 1). The input-output circuitry 208 may comprise a user interface, such as a display, and may further comprise the components that govern use of the user interface, such as a web browser, mobile application, dedicated client device, or the like. In some embodiments, the input-output circuitry 208 may include a keyboard, a mouse, a touch screen, touch areas, soft keys, a microphone, a speaker, and/or other input/output mechanisms. The input-output circuitry 208 may utilize the processor 202 to control one or more functions of one or more of these user interface elements through software instructions (e.g., application software and/or system software, such as firmware) stored on a memory (e.g., memory 204) accessible to the processor 202.

In addition, the apparatus 200 further comprises statistical analysis circuitry 210 that preprocesses a query request. The statistical analysis circuitry 210 may utilize processor 202, memory 204, or any other hardware component included in the apparatus 200 to perform these operations, as described in connection with FIGS. 3-5B below. The statistical analysis circuitry 210 may further utilize communications circuitry 206 to gather data from a variety of sources (e.g., client devices 110A-110N, data hosts 112A-112N, and/or storage device 106, as shown in FIG. 1), may utilize input-output circuitry 208 to receive data from a user, and in some embodiments may utilize processor 202 and/or memory 204 to preprocess a query request and/or identify one or more updated data sets.

In addition, the apparatus 200 further comprises resource determination circuitry 212 that determines an estimated resource consumption level of a given query request. The resource determination circuitry 212 may utilize processor 202, memory 204, or any other hardware component included in the apparatus 200 to perform these operations, as described in connection with FIGS. 3-5B below. The resource determination circuitry 212 may further utilize communications circuitry 206 to gather data from a variety of sources (e.g., client devices 110A-110N, data hosts 112A-

112N, and/or storage device 106, as shown in FIG. 1), may utilize input-output circuitry 208 to receive data from a user, and in some embodiments may utilize processor 202 and/or memory 204 to retrieve complexity data and estimate a resource consumption level based on the complexity data, as further detailed below.

Finally, the apparatus 200 further comprises query modification circuitry 214 that generates a modified query. The query modification circuitry 214 may utilize processor 202, memory 204, or any other hardware component included in the apparatus 200 to perform these operations, as described in connection with FIGS. 3-5B below. The query modification circuitry 214 may further utilize communications circuitry 206 to gather data from a variety of sources (e.g., client devices 110A-110N, data hosts 112A-112N, and/or storage device 106, as shown in FIG. 1), may utilize input-output circuitry 208 to receive data from a user, and in some embodiments may utilize processor 202 and/or memory 204 to generate a modified query, as further detailed below.

Although components 202-214 are described in part using functional language, it will be understood that the particular implementations necessarily include the use of particular hardware. It should also be understood that certain of these components 202-214 may include similar or common hardware. For example, the statistical analysis circuitry 210, resource determination circuitry 212, and query modification circuitry 214 may each at times leverage use of the processor 202, memory 204, communications circuitry 206, or input-output circuitry 208, such that duplicate hardware is not required to facilitate operation of these physical elements of the apparatus 200 (although dedicated hardware elements may be used for any of these components in some embodiments, such as those in which enhanced parallelism may be desired). Use of the term "circuitry" with respect to elements of the apparatus therefore shall be interpreted as necessarily including the particular hardware configured to perform the functions associated with the particular element being described. Of course, while the term "circuitry" should be understood broadly to include hardware, in some embodiments, the term "circuitry" may in addition refer to software instructions that configure the hardware components of the apparatus 200 to perform the various functions described herein.

Although the statistical analysis circuitry 210, resource determination circuitry 212, and query modification circuitry 214 may leverage processor 202, memory 204, communications circuitry 206, or input-output circuitry 208 as described above, it will be understood that any of these elements of apparatus 200 may include one or more dedicated processor, specially configured field programmable gate array (FPGA), or application specific interface circuit (ASIC) to perform its corresponding functions, and may accordingly leverage processor 202 executing software stored in a memory (e.g., memory 204), or memory 204, communications circuitry 206 or input-output circuitry 208 for enabling any functions not performed by special-purpose hardware elements. In all embodiments, however, it will be understood that the statistical analysis circuitry 210, resource determination circuitry 212, and query modification circuitry 214 are implemented via particular machinery designed for performing the functions described herein in connection with such elements of apparatus 200.

In some embodiments, various components of the apparatus 200 may be hosted remotely (e.g., by one or more cloud servers) and thus need not physically reside on the corresponding apparatus 200. Thus, some or all of the functionality described herein may be provided by third party circuitry. For example, a given apparatus 200 may access one or more third party circuitries via any sort of networked connection that facilitates transmission of data and electronic information between the apparatus 200 and the third party circuitries. In turn, that apparatus 200 may be in remote communication with one or more of the other components describe above as comprising the apparatus 200.

As will be appreciated based on this disclosure, example embodiments contemplated herein may be implemented by an apparatus 200. Furthermore, some example embodiments may take the form of a computer program product comprising software instructions stored on at least one non-transitory computer-readable storage medium (e.g., memory 204). Any suitable non-transitory computer-readable storage medium may be utilized in such embodiments, some examples of which are non-transitory hard disks, CD-ROMs, flash memory, optical storage devices, and magnetic storage devices. It should be appreciated, with respect to certain devices embodied by apparatus 200 as described in FIG. 2, that loading the software instructions onto a computing device or apparatus produces a special-purpose machine comprising the means for implementing various functions described herein.

Having described specific components of example apparatuses 200, example embodiments are described below in connection with a series of flowcharts.

Example Operations

Turning to FIGS. 3-5B, example flowcharts are illustrated that contain example operations implemented by example embodiments described herein. The operations illustrated in FIGS. 3-5B may, for example, be performed by system device 104 of the query optimization system 102 shown in FIG. 1, which may in turn be embodied by an apparatus 200, which is shown and described in connection with FIG. 2. To perform the operations described below, the apparatus 200 may utilize one or more of processor 202, memory 204, communications circuitry 206, input-output circuitry 208, statistical analysis circuitry 210, resource determination circuitry 212, query modification circuitry 214, and/or any combination thereof. It will be understood that user interaction with the query optimization system 102 may occur directly via input-output circuitry 208, or may instead be facilitated by a separate client devices 110A-110N, as shown in FIG. 1, and which may have similar or equivalent physical componentry facilitating such user interaction.

Figure 3:
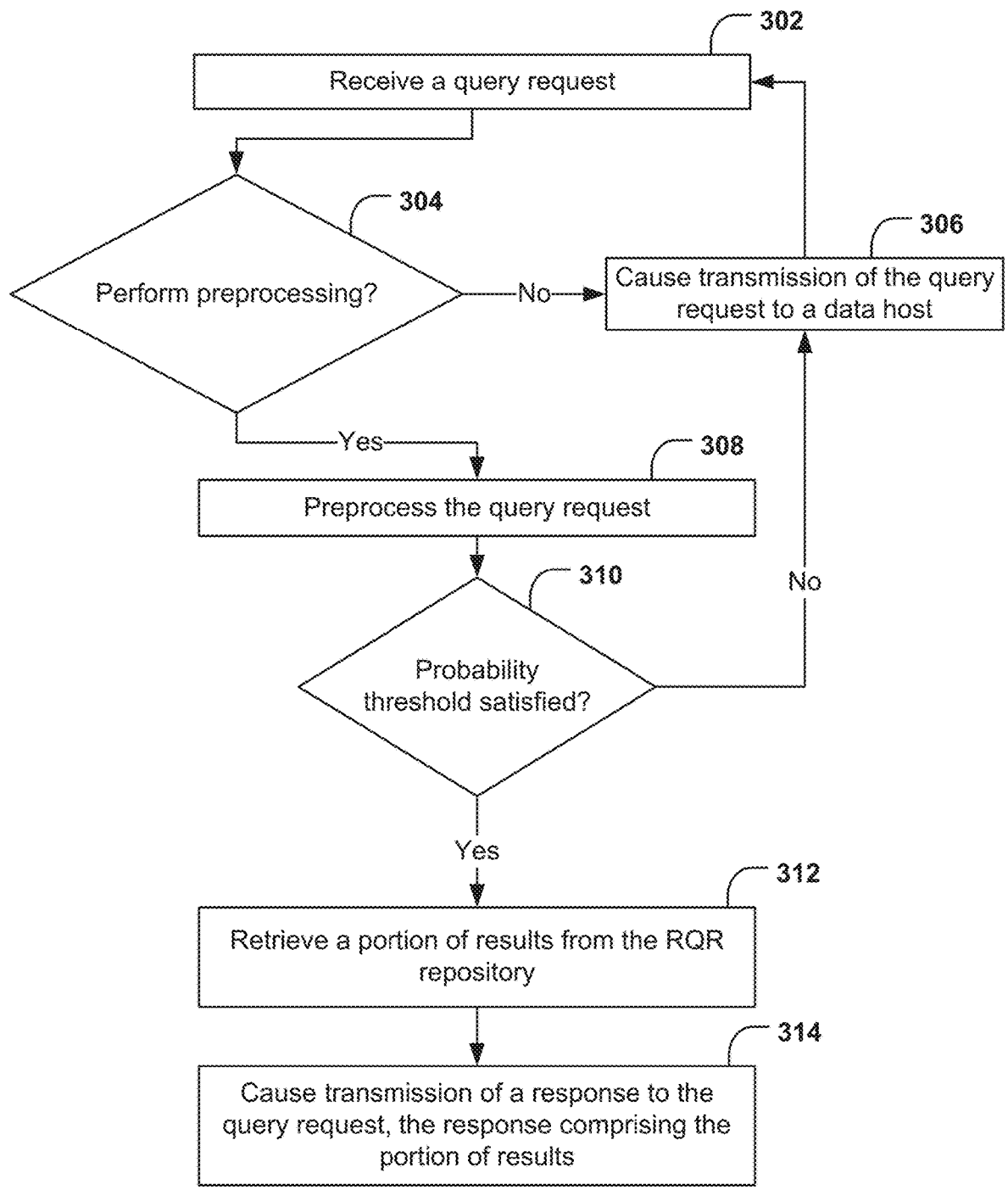
FIG. 3 illustrates an example flowchart for reducing computation resource usage in a query-based data access system, in accordance with some example embodiments described herein.

Turning first to FIG. 3, example operations are shown for reducing computational resource usage in a query-based data access system.

As shown by operation 302, the apparatus 200 includes means, such as processor 202, memory 204, communications circuitry 206, input-output circuitry 208, or the like, for receiving a query request. In some embodiments, the query request may be received from a user directly interacting with the query optimization system 102 (e.g., via input-output circuitry 208. In some embodiments, the query request may be received from another device (e.g., a client device 110A-110N) via communications circuitry 206 over the communications network 108.

Figure 4:
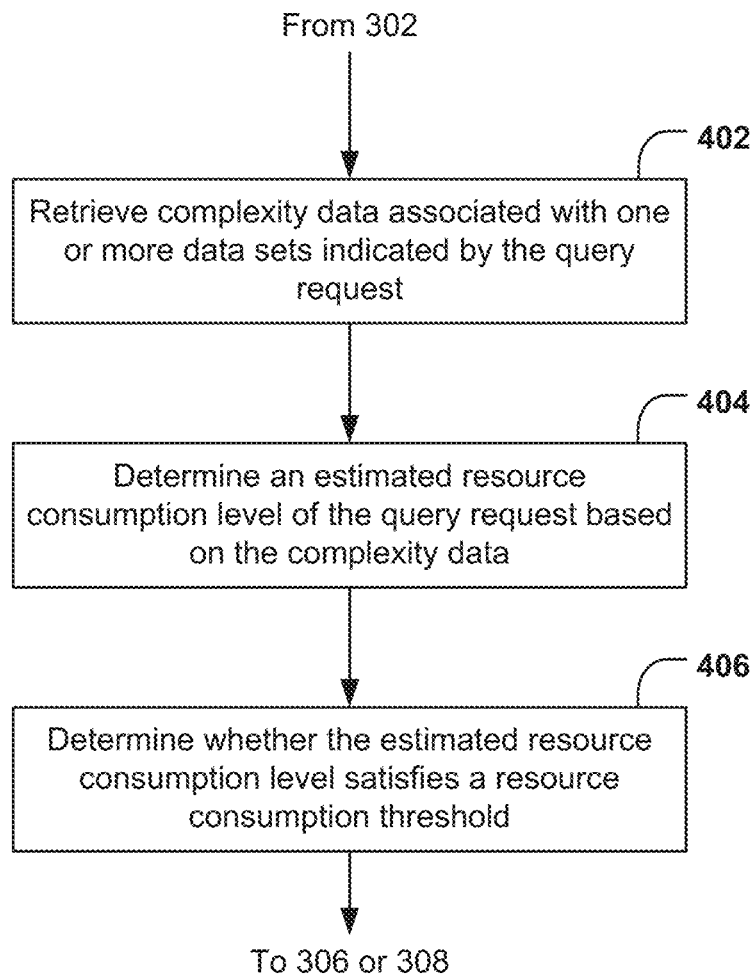
FIG. 4 illustrates an example flowchart for determining whether to perform preprocessing based on a query request, in accordance with some example embodiments described herein.

In some embodiments, upon receiving a query request, the query request may first be analyzed to determine whether to preprocess the query request. In this regard, detailed queries tailored to significantly large data sets having specific parameters may benefit more from preprocessing than, for example, simple queries tailored to minor data sets comprising simple operations (e.g., field value to constant comparisons, matching value search, and/or the like). In other words, queries exhibiting a low resource consumption level may be forwarded on for execution rather than attempting to save computational resources through further preprocessing of the query, as the effects of preprocessing the query may outweigh the cost of simply executing the query. In this regard, as shown by decision point 304, the apparatus 200 includes means, such as processor 202, memory 204, communications circuitry 206, input-output circuitry 208, resource determination circuitry 212, or the like, for determining, based on the query request, whether to preprocess the query request. Turning briefly to FIG. 4, example operations for determining whether to preprocess a query request are shown.

As shown by operation 402, the apparatus 200 includes means, such as processor 202, memory 204, communications circuitry 206, input-output circuitry 208, resource determination circuitry 212, or the like, for retrieving, prior to the preprocessing of the query request, complexity data associated with one or more data sets indicated by the query request. For example, a query included in the query request may include references to one or more data sets, such as databases, tables, or the like. In this regard, the query may be parsed or otherwise textually analyzed to identify data sets which the query references. Complexity data may include data relating to a configuration and/or size of the data sets. For example, complexity data may comprise a known or estimated size of a database or table (e.g., a size in petabytes, terabytes, gigabytes, megabytes, and/or the like), allocated and/or unallocated space of a database, configuration information (e.g., from a configuration file) of a database which may include information needed to interact with a database (e.g., security protocols, etc.), geolocation information of a server or the like that stores the data sets, and/or the like.

Complexity data may be retrieved in a number of ways. In some embodiments, the information may already be known and stored by the query optimization system (e.g., in storage device 106, memory 204, and/or the like) based on previous queries processed by the query optimization system. In this regard, in response to identifying a data set from the query, the complexity data may be retrieved from a location in memory corresponding to the data set. In some embodiments in which the complexity data is not pre-stored, a lightweight query may be generated and transmitted to a data host associated with the data set in order to acquire the complexity data. In other words, the query optimization system 102 may ping a data host for complexity data, and in response, receive the complexity data from the data host. It is to be appreciated that other methods and/or mechanisms for acquiring complexity may also be employed.

As shown by operation 404, the apparatus 200 includes means, such as processor 202, memory 204, resource determination circuitry 212, or the like, for determining an estimated resource consumption level of the query request based on the complexity data.

In some embodiments, the estimated resource consumption level may be determined by analyzing both the query of the query request and the complexity data using an inference model (e.g., a machine learning (ML) model) to infer an estimated resource consumption level of the query. In some embodiments, the inference may be performed using supervised or unsupervised ML. The model may be trained on historic data captured by processing queries over the data sets and analyzing the resource consumption of the processed queries. The estimated resource consumption level may be a value, e.g., between zero and one, with a value closer to one indicating a higher estimated use of computational resources.

As shown by operation 406, the apparatus 200 includes means, such as processor 202, memory 204, resource determination circuitry 212, or the like, for determining whether the estimated resource consumption level satisfies a resource consumption threshold. The resource consumption threshold may be a predetermined value with which the estimated resource consumption level can be compared. For example, in some embodiments, if the estimated resource consumption level satisfies (e.g., is greater than or equal to) the resource consumption threshold, a determination may be made to proceed with preprocessing the query request, as significant computational resources will likely be reduced by doing so. In some embodiments, if the estimated resource consumption level does not satisfy (e.g., is less than) the resource consumption threshold, a determination may be made to not preprocess the query request and instead proceed with causing transmission of a query associated with the query request to one or more data hosts in order to execute the query. In other words, an estimated resource consumption level that is less than the resource consumption threshold may indicate that the query will likely not significantly impact computational resources enough to warrant preprocessing the query.

Returning to decision point 304 of FIG. 3, in response to determining that the estimated resource consumption level does not satisfy the resource consumption threshold, the method may continue to operation 306, wherein the apparatus 200 includes means, such as processor 202, memory 204, communications circuitry 206, or the like, for causing transmission of the query request to a data host. In some embodiments, the data host may comprise multiple data hosts. The data host may be a data host associated with one or more data sets indicated by the query of the query request. In some embodiments, the entire query request may be provided to the data host, and in other embodiments, only a portion of the query request may be provided to the data host (e.g., the actual query itself). In this regard, the apparatus 200 includes means, such as processor 202, memory 204, communications circuitry 206, or the like, for causing transmission of a query for execution.

Once the query has been executed (e.g., over the data sets at the data host(s)), results of the query in the form of a query result set may be returned to the query optimization system. In this regard, the apparatus 200 includes means, such as processor 202, memory 204, communications circuitry 206, or the like, for receiving a query result set based on execution of the query. The query result set may be received from the data host(s) upon the query being executed over the one or more data sets. Upon receiving the query result set, the query result set may then be provided to a client device from which the query request originated. In this regard, the apparatus 200 includes means, such as processor 202, memory 204, communications circuitry 206, or the like, for causing transmission of a response to the query request that comprises the query result set. In some embodiments, for example, in instances in which the query request originated in response to a direct input by a user, upon receiving the query result set, the query optimization system 102 may cause presentation of the query result set (e.g., via a visual display, audio output, and/or the like). In this regard, the apparatus 200 includes means, such as processor 202, memory 204, communications circuitry 206, input-output circuitry 208, or the like, for causing presentation of the query result set. As shown in FIG. 3, the process may then return to operation 302, wherein the query optimization system 102 continuously receives query requests.

In some embodiments, in response to determining that the estimated resource consumption level satisfies the resource consumption threshold, the method may continue to operation 308, wherein the apparatus 200 includes means, such as processor 202, memory 204, statistical analysis circuitry 210, or the like, for preprocessing the query request prior to an execution of a query associated with the query request.

Figure 5A:
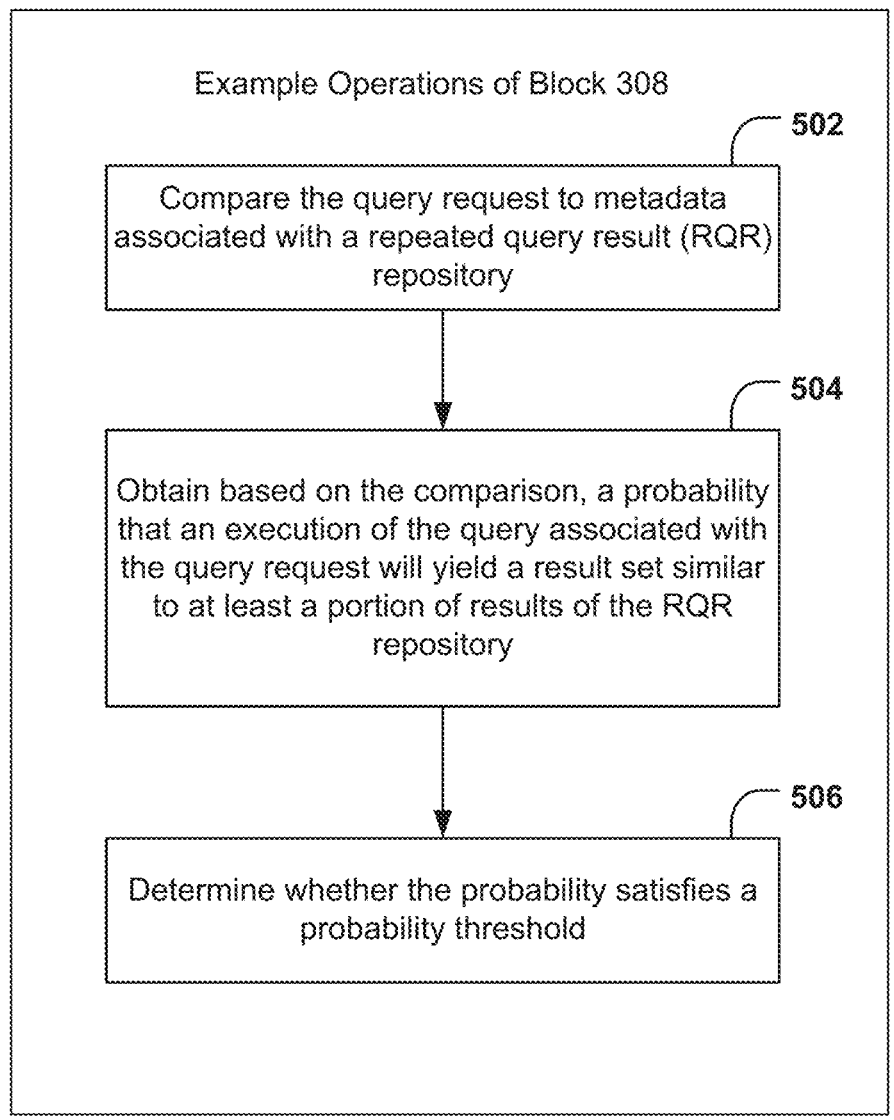
FIG. 5A illustrates an example flowchart for preprocessing a query request, in accordance with some example embodiments described herein.
Figure 5B:
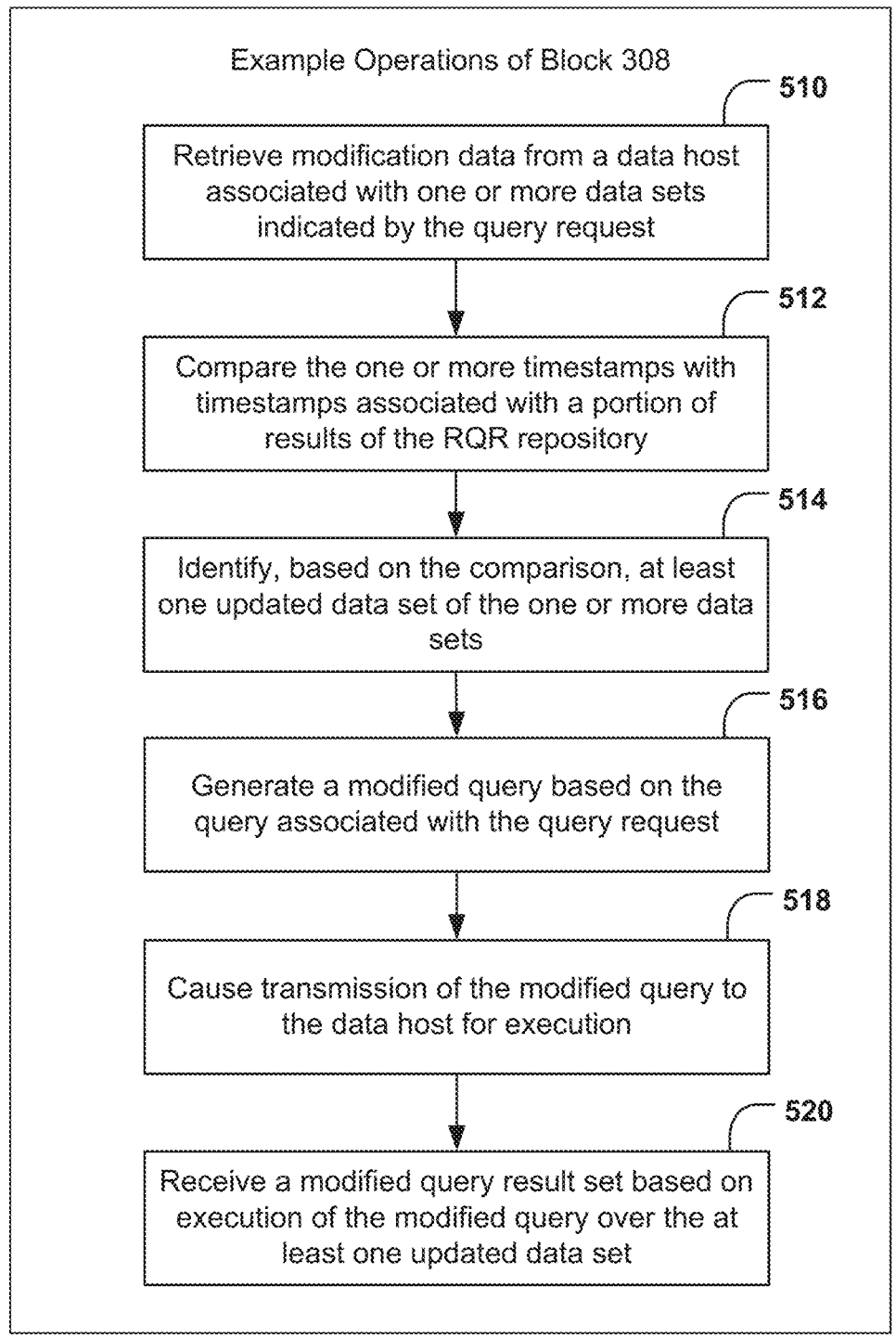
FIG. 5B illustrates another example flowchart for preprocessing a query request, in accordance with some example embodiments described herein.

FIGS. 5A and 5B illustrate example operations that may be involved in preprocessing a query request (as shown by operation 304 of FIG. 3). Turning first to FIG. 5A, example operations involved in preprocessing a query request are shown.

As shown by operation 502, the apparatus 200 includes means, such as processor 202, memory 204, statistical analysis circuitry 210, or the like, for comparing the query request to metadata associated with a repeated query result (RQR) repository.

In some embodiments, the RQR repository may comprise metadata describing the previously generated query results that are stored in the RQR repository. This metadata may comprise, for example, date and/or times at which the query results were generated and/or stored, data sets from which the query results were returned, and elements of queries that triggered the results to be returned. For example, an element of a query identified by the metadata may comprise textual strings of a query which caused a repeated return of those results.

In some embodiments, the RQR repository may be local to the device (e.g., client device 110A-110N). For example, the RQR repository may be stored in a location in a memory of the device, at another entity associated with a network of the device (e.g., a server physically local to the device) and/or the like. In this regard, the query optimization system 102 may identify an RQR repository from which to analyze metadata during the preprocessing. In some embodiments, the RQR repository may be identified based on a device identifier or user identifier associated with the query request. Based on the identifier, the query optimization system may identify the correct RQR repository from which to retrieve and analyze metadata based on a device identifier or user identifier in the query request.

In some embodiments, comparing the query request to the metadata may comprise comparing a query of the query request to elements of queries defined in the metadata. For example, the query optimization system 102, through a statistical analysis, may compare the metadata to the query to identify one or more matching elements. It is to be appreciated that other methods of comparison (e.g., techniques such as artificial intelligence, machine learning, natural language processing (NLP), and/or the like) may be employed to compare the query request to the metadata (and obtain a probability as further described below). If a matching element (e.g., a command referencing particular databases, tables, records, fields and/or the like) is identified, it may be determined that pre-stored results of the RQR repository that are associated with the matching element may be retrieved and provided as results to the query request rather than executing the query associated with the query request to otherwise return the same results.

As shown by operation 504, the apparatus 200 includes means, such as processor 202, memory 204, statistical analysis circuitry 210, or the like, for obtaining, based on the comparison, a probability that an execution of the query associated with the query request will yield a result set similar to at least a portion of results of the RQR repository. For example, a probability value may be calculated based on a number of matching elements between the query and the metadata.

The probability may then be compared with a probability threshold. In this regard, as shown by operation 506, the apparatus 200 includes means, such as processor 202, memory 204, statistical analysis circuitry 210, or the like, for determining whether the probability satisfies a probability threshold. In some embodiments, the probability threshold may be a predefined value with which the probability value can be compared. For example, in some embodiments, if the probability value satisfies (e.g., is greater than or equal to) the probability threshold, a determination may be made to proceed with retrieving the results from the RQR repository and providing the results as a response to the query request. In some embodiments, if the probability does not satisfy (e.g., is less than) the probability threshold, a determination may be made to proceed with causing transmission of the query associated with the query request to one or more data hosts in order to execute the query. In other words, a probability that is less than the probability threshold may indicate that the RQR repository likely does not contain results needed for the query.

Returning to FIG. 3, at decision point 310, in response to determining that the probability does not satisfy the probability threshold, the method may continue to operation 306, wherein the query request is forwarded on to a data host to execute a query associated with the query request. Following execution, a query result set may be received from the data host upon the query being executed over the one or more data sets. As described above, upon receiving the query result set, the query result set may then be provided to a client device from which the query request originated.

In some embodiments, in response to determining that the probability satisfies the probability threshold, the method may continue to operation 312, wherein the apparatus 200 includes means, such as processor 202, memory 204, communications circuitry 206, or the like, for retrieving a portion of results from the RQR repository. In some embodiments, the results may be retrieved from the RQR repository via communications circuitry 206. For example, in some embodiments, the relevant results may be accessed and retrieved from the RQR repository. In some embodiments, a query may be executed over the RQR repository (e.g., the original query of the query request or the original query having been modified to execute over the RQR repository).

Upon retrieving the portion of results from the RQR repository, the method may continue to operation 314, wherein the apparatus 200 includes means, such as processor 202, memory 204, communications circuitry 206, or the like, for causing transmission of a response to the query request. The response may comprise the portion of results retrieved from the RQR repository.

In some embodiments, additional operations relating to modifying a query of a query request may be involved in the preprocessing of a query request (e.g., as shown in operation 304). Turning to FIG. 5B, example operations are shown for modifying a query of a query request. As detailed below, these operations help maintain data freshness (e.g., timeliness) of query results provided by the query optimization system 102 in responses to query requests, while still reducing computational resource usage.

As shown by operation 510, the apparatus 200 includes means, such as processor 202, memory 204, communications circuitry 206, or the like, for retrieving modification data from a data host associated with one or more data sets indicated by the query request. In some embodiments, the modification data may be data indicating a time at which the one or more data sets of the query request were modified (e.g., changed or updated). The modification data may be in the form of a file, such as a history or database statistics file. Regardless of the structure of the modification data, the modification data may comprise one or more timestamps associated with updates to the one or more data sets (e.g., times at which the one or more data sets were modified).

The modification data may be retrieved in a variety of ways. For example, in some embodiments, a relationship between the query optimization system 102 and the data host(s) may be established such that the data host(s) regularly transmit modification data to the query optimization system 102 (e.g., each time a data set is updated). In this regard, the modification data may simply be retrieved at the query optimization system 102 (e.g., via memory 204 or storage device 106). Alternatively, in some embodiments, a lightweight query may be generated at the query optimization system 102 and transmitted to the data host(s) in order to request modification data from the data host. In response, the data host(s) may provide the modification data to the query optimization system 102. It is to be appreciated that other methods and/or mechanisms for acquiring modification may also be employed.

As shown by operation 512, the apparatus 200 includes means, such as processor 202, memory 204, statistical analysis circuitry 210, or the like, for comparing the one or more timestamps with timestamps associated with a portion of results of the RQR repository. In other words, metadata associated with results stored in the RQR repository that would have been retrieved and provided in a response to the query request may first be assessed to ensure that these results are up-to-date. In this regard, timestamps in the metadata associated with the results stored in the RQR repository may be compared with the timestamps indicated by the modification data to determine whether a portion of the query needs to be executed. As one example, an example query request may be received which contains an example query which indicates certain data is to be retrieved from a "Data Set A." Results stored in the RQR repository that are associated with Data Set A may indicate a timestamp of, e.g., January 2, 9:01:55 AM, while the modification data may indicate that the most recent modification of Data Set A took place on, e.g., January 2, 10:30:02 AM. Since the modification data indicates a later time than the RQR repository metadata, this may indicate that a portion of the query associated with Data Set A should be executed via a modified query over Data Set A to retrieve fresh results for that portion of the query. Said differently, retrieving the results from the RQR repository without first checking to see if the data set was modified may result in the query response having incorrect or incomplete data.

As shown by operation 514, the apparatus 200 includes means, such as processor 202, memory 204, statistical analysis circuitry 210, or the like, for identifying, based on the comparison, at least one updated data set of the one or more data sets. An updated data set may be identified based on the modification data having timestamp indicating a later time than a timestamp indicated in the metadata of the RQR repository.

As shown by operation 516, the apparatus 200 includes means, such as processor 202, memory 204, query modification circuitry 214, or the like, for generating a modified query based on the query associated with the query request. In some embodiments, the modified query is configured to execute only over the at least one updated data set. Said differently, elements of a query relating to data sets which have not been updated since results associated with those elements of the query were stored in the RQR repository may automatically be parsed and removed from the query. The removal of these elements results in a modified query which may then be executed over the updated data sets to retrieve fresh data for a response to the query. Returning to the above example, if the example query also indicated that certain data is to be retrieved from a "Data Set B," and a comparison of the modification data to metadata of results stored in the RQR repository that are associated with Data Set B indicate that Data Set B had not been updated since storage of the results in the RQR repository, the modified query may be generated such that reference to Data Set B is removed and the modified query is configured to only execute over Data Set A.

As shown by operation 518, the apparatus 200 includes means, such as processor 202, memory 204, communications circuitry 206, or the like, for causing transmission of the modified query to the data host for execution. In this regard, the modified query may then be executed over data sets at one or more data hosts.

As shown by operation 520, the apparatus 200 includes means, such as processor 202, memory 204, communications circuitry 206, or the like, for receiving a modified query result set based on execution of the modified query over the at least one updated data set. In this regard, the data host(s) may return results of the modified query.

Returning to operation 314 of FIG. 3 and continuing with the above example, in embodiments in which a modified query is generated, a response to the query request may include both (i) the modified query result set and (ii) the portion of results of the RQR repository. Said differently, results for the portion of the query relating to Data Set A may be returned through execution of the modified query, while results for the portion of the query relating to Data Set B may be returned from the RQR repository. In this regard, in providing a response to the query request, data freshness is ensured (e.g., through executing the modified query) while computational resources are reduced (e.g., through retrieval from the RQR repository).

As described above, example embodiments provide methods and apparatuses that enable improved energy efficiency through reducing computational resource usage in a query-based data access system. Example embodiments thus provide tools that overcome the problems faced by conventional query-based data access systems. By avoiding continuous execution of repeatedly submitted queries over a distributed network of entities, example embodiments thus significantly save computational resources. Moreover, embodiments described herein avoid the problem of stale data in pre-stored results by generating modified queries which ensure both up-to-date query results and a lesser usage of computational resources.

As these examples all illustrate, example embodiments contemplated herein provide technical solutions that solve real-world problems faced during operation of query-based data access systems. And while excessive computational resource usage has been an issue for decades, the recently exploding amount of data made available by recently emerging technology today has made this problem significantly more acute, as the demand for less energy consumption through "greener" methods has grown significantly even while the complexity of distributed systems has increased. At the same time, the recently arising ubiquity of data analysis has unlocked new avenues to solving this problem that historically were not available, and example embodiments described herein thus represent a technical solution to these real-world problems.

FIGS. 3-5B illustrate operations performed by apparatuses, methods, and computer program products according to various example embodiments. It will be understood that each flowchart block, and each combination of flowchart blocks, may be implemented by various means, embodied as hardware, firmware, circuitry, and/or other devices associated with execution of software including one or more software instructions. For example, one or more of the operations described above may be embodied by software instructions. In this regard, the software instructions which embody the procedures described above may be stored by a memory of an apparatus employing an embodiment of the present invention and executed by a processor of that apparatus. As will be appreciated, any such software instructions may be loaded onto a computing device or other programmable apparatus (e.g., hardware) to produce a machine, such that the resulting computing device or other programmable apparatus implements the functions specified in the flowchart blocks. These software instructions may also be stored in a computer-readable memory that may direct a computing device or other programmable apparatus to function in a particular manner, such that the software instructions stored in the computer-readable memory produce an article of manufacture, the execution of which implements the functions specified in the flowchart blocks. The software instructions may also be loaded onto a computing device or other programmable apparatus to cause a series of operations to be performed on the computing device or other programmable apparatus to produce a computer-implemented process such that the software instructions executed on the computing device or other programmable apparatus provide operations for implementing the functions specified in the flowchart blocks.

The flowchart blocks support combinations of means for performing the specified functions and combinations of operations for performing the specified functions. It will be understood that individual flowchart blocks, and/or combinations of flowchart blocks, can be implemented by special purpose hardware-based computing devices which perform the specified functions, or combinations of special purpose hardware and software instructions.

In some embodiments, some of the operations above may be modified or further amplified. Furthermore, in some embodiments, additional optional operations may be included. Modifications, amplifications, or additions to the operations above may be performed in any order and in any combination.

Conclusion

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method comprising:
   determining, by resource determination circuitry, an estimated resource consumption level of a query based on one or more data sets indicated by the query;
   determining, by the resource determination circuitry, that the estimated resource consumption level satisfies a resource consumption threshold; and
   in response to determining that the estimated resource consumption level satisfies the resource consumption threshold:
      determining, by statistical analysis circuitry, a probability that an execution of the query will yield a result similar to at least a portion of stored results of a repeated query result (RQR) repository,
      determining, by the statistical analysis circuitry, that the probability satisfies a probability threshold, and
      in response to determining that the probability satisfies the probability threshold:
         retrieving, by communications circuitry, the portion of stored results from the RQR repository; and
         causing transmission, by the communications circuitry, of the portion of stored results.

2. The method of claim 1, wherein the RQR repository stores previous results that have been repeatedly generated a predefined number of times by previous queries.

3. The method of claim 1, further comprising:
   retrieving, by the communications circuitry, modification data from a data host associated with the one or more data sets, wherein the modification data comprises one or more timestamps associated with updates to the one or more data sets;
   comparing, by the statistical analysis circuitry, the one or more timestamps with timestamps associated with the portion of results of the RQR repository; and
   identifying, by the statistical analysis circuitry and based on the comparison, at least one updated data set of the one or more data sets.

4. The method of claim 3, further comprising:
   generating, by query modification circuitry, a modified query based on the query associated, wherein the modified query is configured to execute only over the at least one updated data set.

5. The method of claim 4, wherein generating the modified query comprises removing one or more elements of the query that correspond to one or more data sets that have not been updated since a time at which results associated with the one or more elements were stored in the RQR repository.

6. The method of claim 4, further comprising:
   receiving, by the communications circuitry, a modified query result set based on execution of the modified query over the at least one updated data set,
   wherein causing transmission of the portion of stored results further comprises causing transmission of the modified query result set.

7. The method of claim 1, further comprising:
   receiving, by the communications circuitry and from a device, the query as part of a query request,
   wherein the RQR repository is local to the device.

8. An apparatus comprising:
resource determination circuitry configured to:
determine an estimated resource consumption level of a query based on one or more data sets indicated by the query, and
determine that the estimated resource consumption level satisfies a resource consumption threshold;
statistical analysis circuitry configured to, in response to determining that the estimated resource consumption level satisfies the resource consumption threshold:
determine a probability that an execution of the query will yield a result similar to at least a portion of stored results of a repeated query result (RQR) repository, and
determine that the probability satisfies a probability threshold; and
communications circuitry configured to, in response to determining that the probability satisfies the probability threshold:
retrieve the portion of stored results from the RQR repository, and
cause transmission of the portion of stored results.

9. The apparatus of claim 8, wherein the RQR repository stores previous results that have been repeatedly generated a predefined number of times by previous queries.

10. The apparatus of claim 8,
wherein the communications circuitry is further configured to retrieve modification data from a data host associated with the one or more data sets, wherein the modification data comprises one or more timestamps associated with updates to the one or more data sets, and
wherein the statistical analysis circuitry is further configured to:
compare the one or more timestamps with timestamps associated with the portion of results of the RQR repository, and
identify, based on the comparison, at least one updated data set of the one or more data sets.

11. The apparatus of claim 10, further comprising query modification circuitry configured to generate a modified query based on the query associated, wherein the modified query is configured to execute only over the at least one updated data set.

12. The apparatus of claim 11, wherein the query modification circuitry generates the modified query by removing one or more elements of the query that correspond to one or more data sets that have not been updated since a time at which results associated with the one or more elements were stored in the RQR repository.

13. The apparatus of claim 11, wherein the communications circuitry is further configured to:
receive a modified query result set based on execution of the modified query over the at least one updated data set, and
cause transmission of the modified query result set.

14. The apparatus of claim 8, wherein the communications circuitry is further configured to receive, from a device, the query as part of a query request,
wherein the RQR repository is local to the device.

15. A computer program product comprising at least one non-transitory computer-readable storage medium storing software instructions that, when executed, cause an apparatus to:
determine an estimated resource consumption level of a query based on one or more data sets indicated by the query;
determine that the estimated resource consumption level satisfies a resource consumption threshold; and
in response to determining that the estimated resource consumption level satisfies the resource consumption threshold:
determine a probability that an execution of the query will yield a result similar to at least a portion of stored results of a repeated query result (RQR) repository,
determine that the probability satisfies a probability threshold, and
in response to determining that the probability satisfies the probability threshold:
retrieve the portion of stored results from the RQR repository; and
cause transmission of the portion of stored results.

16. The computer program product of claim 15, wherein the RQR repository stores previous results that have been repeatedly generated a predefined number of times by previous queries.

17. The computer program product of claim 15, wherein the software instructions, when executed, further cause the apparatus to:
retrieve modification data from a data host associated with the one or more data sets, wherein the modification data comprises one or more timestamps associated with updates to the one or more data sets;
compare the one or more timestamps with timestamps associated with the portion of results of the RQR repository; and
identify, based on the comparison, at least one updated data set of the one or more data sets.

18. The computer program product of claim 17, wherein the software instructions, when executed, further cause the apparatus to:
generate a modified query based on the query associated, wherein the modified query is configured to execute only over the at least one updated data set.

19. The computer program product of claim 18, wherein generating the modified query comprises removing one or more elements of the query that correspond to one or more data sets that have not been updated since a time at which results associated with the one or more elements were stored in the RQR repository.

20. The computer program product of claim 18, wherein the software instructions, when executed, further cause the apparatus to:
receive a modified query result set based on execution of the modified query over the at least one updated data set,
wherein causing transmission of the portion of stored results further comprises causing transmission of the modified query result set.

* * * * *